Patented Apr. 27, 1943

2,317,737

UNITED STATES PATENT OFFICE 2,317,737

REACTION PRODUCT OF ALDEHYDES AND PYRIMIDINE DERIVATIVES

Gaetano F. D'Alelio and James W. Underwood, Pittsfield, Mass., assignors to General Electric Company, a corporation of New York No Drawing. Application June 18, 1941,
Serial No. 398,638

19 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a pyrimidyl carbamyl-alkyl sulfide (pyrimidyl-thio-acylamide) or a pyrimidyl thiocarbamyl-alkyl sulfide (pyrimidyl-thio-acylthioamide) corresponding to the following general formula:

I

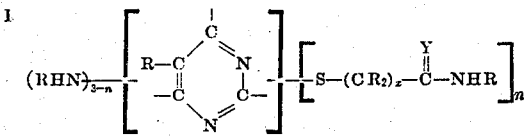

In the above formula $n$ represents an integer and is at least 1 and not more than 3, $x$ is an integer and is at least 1 and not more than 2, Y represents a member of the class consisting of oxygen and sulfur, and R represents a member of the class consisting of hydrogen and monovalent hydrocarbon and halo-hydrocarbon radicals, numerous examples of which hereafter are given. Since $x$ represents an integer which is 1 or 2, it will be seen that the linkage of the carbamyl-alkyl (or thiocarbamyl-alkyl) group to the sulfur atom in all cases will be alpha or beta to the carbamyl (—CONH$_2$) or thiocarbamyl (—CSNH$_2$) group. It also will be observed that linkage of the pyrimidyl grouping to the sulfur atom is through a carbon atom. From a consideration of the formula it further will be seen that when $n$ is 3 there will be no amino groups attached to the pyrimidine nucleus.

Illustrative examples of monovalent hydrocarbon radicals which R in the above formula may be are aliphatic (e. g., methyl, ethyl, propyl, isopropyl, butyl, secondary butyl, isobutyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R is hydrogen.

More specific examples of pyrimidyl carbamyl-alkyl and thiocarbamyl-alkyl sulfides that may be employed in producing our new condensation products are pyrimidyl tri-(carbamyl-methyl sulfide), pyrimidyl tri-(carbamyl-ethyl sulfide), pyrimidyl tri-(thiocarbamyl-methyl sulfide), pyrimidyl tri-(thiocarbamyl-ethyl sulfide), the monoamino pyrimidyl di-(carbamyl-methyl sulfides), the monoamino pyrimidyl di-(thiocarbamyl-methyl sulfides), the monoamino pyrimidyl di-(carbamyl-ethyl sulfides), the monoamino pyrimidyl di-(thiocarbamyl-ethyl sulfides), the diamino pyrimidyl mono-(carbamyl-methyl sulfides), the diamino pyrimidyl mono-(thiocarbamyl-methyl sulfides), the diamino pyrimidyl mono-(carbamyl-ethyl sulfides) and the diamino pyrimidyl mono-(thiocarbamyl-ethyl sulfides).

The pyrimidyl carbamyl-alkyl and thiocarbamyl-alkyl sulfides that are used in carrying the present invention into effect are more fully described and are specifically claimed in our copending application Serial No. 398,639, filed concurrently herewith, now Patent No. 2,295,560, issued September 15, 1942, and assigned to the same assignee as the present invention.

Other and more specific examples of pyrimidyl carbamyl-alkyl and thiocarbamyl-alkyl sulfides that may be used in producing our new condensation products are listed below:

4,6-diamino pyrimidyl-2 thiocarbamyl-methyl sulfide
Pyrimidyl-2,4,6 tri-(beta-carbamyl-ethyl sulfide)
6-amino pyrimidyl-2,4 di-(carbamyl-methyl sulfide)
2-amino pyrimidyl-4,6 di-(thiocarbamyl-methyl sulfide)
2,4-diamino 5-methyl pyrimidyl-6 carbamyl-methyl sulfide
6-amino pyrimidyl 2-carbamyl-methyl 4-(beta-carbamyl-ethyl) disulfide
4-anilino 6-methylamino pyrimidyl-2 carbamyl-methyl sulfide
4,6-diamino pyrimidyl-2 beta-cyclohexylcarbamyl-ethyl sulfide
4,6-diamino pyrimidyl-2 alpha-carbamyl-ethyl sulfide
4,6-di-(methylamino) 5-phenyl pyrimidyl-2 beta-(alpha-phenyl carbamyl-butyl) sulfide
4,6-dianilino pyrimidyl-2 beta-(gamma-cyclohexyl methylcarbamyl-propyl) sulfide
2,6-diamino 5-methyl pyrimidyl-4 alpha-(phenylcarbamyl-ethyl) sulfide [2,4-diamino 5-methyl pyrimidyl-6 alpha-(phenylcarbamyl-ethyl) sulfide]
6-toluido 5-ethyl pyrimidyl-2,4 di-[beta-(cyclohexylcarbamyl-propyl) sulfide]
2-methylamino 5-phenyl pyrimidyl-4,6 di-[beta-(alpha-chlorphenyl carbamyl-ethyl) sulfide]

Pyrimidyl-2,4,6 tri-(benzylcarbamyl-methyl sulfide)

6-amino pyrimidyl-2,4 di-(thiocarbamyl-methyl sulfide) [4-amino pyrimidyl-2,6 di-(thiocarbamyl-methyl sulfide)]

5-phenyl pyrimidyl-2,4,6 tri-[beta-(alpha-phenyl carbamyl-propyl) sulfide]

6-amino pyrimidyl 2-carbamyl-methyl 4-thiocarbamyl-methyl disulfide

The formulas for the above compounds are shown in our above-identified copending application Serial No. 398,639.

The present invention is based on our discovery that new and valuable materials of particular utility in the plastics and coating arts can be produced by effecting reaction between ingredients comprising essentially an aldehyde, including polymeric aldehydes and aldehyde-addition products, and certain pyrimidyl carbamyl-alkyl sulfides or pyrimidyl thiocarbamyl-alkyl sulfides (pyrimidyl - thioacylamides or pyrimidyl-thioacylthioamides), numerous examples of which have been given above and in our above-identified copending application.

Resins heretofore have been made by condensing an aldehyde with certain pyrimidine thioethers, but such known resins are not entirely satisfactory from the standpoint of optimum heat-, water- and abrasion-resistance and in curing characteristics. One possible explanation for these deficiencies in desirable properties is the fact that the starting material contains thio groups that are aldehyde-non-reactable. In marked contrast the starting organic sulfides used in practicing this invention contain aldehyde-reactable thio groups attached to the pyrimidyl nucleus, thereby imparting to the condensation products of such sulfides with aldehydes increased heat-, water- and abrasion-resistance and improved curing characteristics as compared with known resinous condensation products of an aldehyde and a pyrimidine thioether.

In practicing our invention the initial condensation reaction may be carried out at normal or at elevated temperatures, at atmospheric, subatmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the pyrimidine derivative used by the applicants may be carried out in the presence of solvents or diluents, fillers, other natural or synthetic resinous bodies, or while admixed with other materials which also can react with the aldehydic reactant or with the pyrimidine derivative, e. g., ketones, urea, thiourea, selenourea, iminourea, (guanidine), substituted ureas, thioureas, selenoureas and iminoureas, numerous examples of which are given in various copending applications of one of us (Gaetano F. D'Alelio), for instance, in D'Alelio copending application Serial No. 363,037, filed October 26, 1940; monoamides of monocarboxylic and polycarboxylic acids and polyamides of polycarboxylic acids, e. g., acetamide, halogenated acetamides, e. g., a chlorinated acetamide, maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; 5-membered aminotriazines, which compounds also may be named aminotriazoles (amidogentriazoles), and aminotriazines (amidogentriazines), e. g., melamine, ammeline, ammelide, numerous other examples being given in various D'Alelio copending applications, for instance, in D'Alelio copending application Serial No. 377,524, filed Feb. 5, 1941, and in applications referred to in said copending application; aminodiazines and aminodiazoles; phenol and substituted phenols, e. g., the cresols, the xylenols, the tertiary alkyl phenols and other phenols such as mentioned in D'Alelio Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the pyrimidine derivative and the aldehyde by mixing all the reactants and effecting condensation therebetween or by various permutations of the reactants as described, for example, in D'Alelio copending application Serial No. 363,037 with particular reference to reactions involving a urea, an aldehyde and a semi-amide of oxalic acid. For instance, we may form a partial condensation product of ingredients comprising urea, a diamino pyrimidyl carbamyl-methyl sulfide and formaldehyde and thereafter effect reaction between this partial condensation product and, for example, a chlorinated acetamide to obtain a heat-curable composition.

Some of the condensation products of this invention are thermoelastic materials while others are thermosetting or potentially thermosetting bodies which convert under heat or under heat and pressure to an insoluble, infusible state. Those materials which are slightly thermoelastic are particularly useful in producing molding compounds suitable for use in making pieces to be molded over screws (as in making bottle caps). The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface-coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

Example 1

| | Parts |
|---|---|
| 4,6-diamino pyrimidyl-2 carbamyl-methyl sulfide | 19.9 |
| Aqueous formaldehyde (approx. 37.1% HCHO) | 24.3 |
| Aqueous ammonia (approx. 28% NH$_3$) | 2.0 |
| Sodium hydroxide in 1.5 parts water | 0.03 |
| Water | 10.0 |
| Chloracetamide (mono-chloracetamide) | 0.5 |

All of the above components with the exception of the chloracetamide were heated together under reflux at the boiling temperature of the mass for 15 minutes. Then the stated amount of chloracetamide was added and refluxing was continued for an additional 5 minutes to cause the chloracetamide to intercondense with the partial condensation product of the pyrimidine derivative and formaldehyde. The resulting resinous syrup was mixed with 20 parts alpha cellulose in flock form and 0.1 part of a mold lubricant, specifically zinc stearate, to form a molding (moldable) compound. The wet compound was dried for 45 minutes at 60° C. and then was ground to powder form. A sample of the ground molding composition was molded for 5 minutes at 140° C. under a pressure of 2,000 pounds per square inch. The molding compound showed good plastic flow during molding. A well-cured molded piece was obtained. It was light in color. The molded article was very resistant to water as evidenced by the fact that, when immersed in boiling water for 15 minutes and then in cold water for 5 minutes, it absorbed only 1.52% by weight of water.

Instead of employing chloracetamide as above described in accelerating the curing of the potentially reactive resinous material, heat-convertible compositions may be produced by adding to the syrup direct or active curing catalysts (e. g., phthalic anhydride, citric acid, etc.), or latent curing catalysts (e. g., sodium chloracetate, diethyl chloracetamide, glycine ethyl ester hydrochloride, etc.) or by intercondensation with other curing reactants (e. g., di- and tri-chloracetamides, chloracetonitriles, alpha, beta-dibrompropionitrile, aminoacetamide hydrochloride, aminoacetonitrile hydrochloride, ethylene diamine monohydrochloride, diethanol amine hydrochloride, nitrourea, glycine, sulfamic acid, chloracetyl urea, chloracetone, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance, in copending application Serial No. 346,962, filed July 23, 1940, and Serial No. 354,395, filed August 27, 1940, both of which applications are assigned to the same assignee as the present invention.

Example 2

| | Parts |
|---|---|
| 4,6-diamino pyrimidyl-2 carbamyl-methyl sulfide | 39.8 |
| Urea | 48.0 |
| Aqueous formaldehyde (approx. 37.1% HCHO) | 81.0 |
| Aqueous ammonia (approx. 28% NH$_3$) | 6.4 |
| Sodium hydroxide in 10 parts water | 0.1 |
| Chloracetamide | 0.5 |

All of the above components with the exception of the chloracetamide were heated together under reflux for 20 minutes, yielding a clear resinous syrup. The chloracetamide was now added and heating was continued for an additional 20 minutes to cause the chloracetamide to intercondense with the resinous partial condensation product. A molding composition was made from the resulting syrup by mixing it with 35 parts alpha cellulose in flock form and 0.2 part zinc stearate. The wet molding compound was oven dried for 4 hours and was then pulverized. A sample of the ground molding composition was molded for 8 minutes at 140° C. under a pressure of 2,000 pounds per square inch. The molded piece was very hard, was light in color and was very well cured throughout. When tested for water absorption as described under Example 1, it showed only 3.44% water retained. The flow of the molding compound during molding was very good.

Example 3

| | Parts |
|---|---|
| 4,6-diamino pyrimidyl-2 carbamyl-methyl sulfide | 19.9 |
| Para-toluene sulfonamide | 15.9 |
| Aqueous formaldehyde (approx. 37.1% HCHO) | 48.6 |
| Aqueous ammonia (approx. 28% NH$_3$) | 3.5 |
| Sodium hydroxide in 3 parts water | 0.06 |
| Chloracetamide | 0.5 |

All of the above components with the exception of the chloracetamide were heated under reflux for 15 minutes, after which the chloracetamide was added and heating was continued for an additional 5 minutes. The resulting resinous syrup was mixed with 20 parts alpha cellulose in flock form and 0.1 part zinc stearate to form a molding compound. The wet compound was oven dried for one hour and was then pulverized. A sample of the ground compound was molded for 8 minutes at 140° C. under a pressure of 2,000 pound per square inch. The molded piece was well-cured throughout and showed good plastic flow during molding.

*Example 4*

| | Parts |
|---|---|
| 4,6-diamino pyrimidyl-2 carbamyl-methyl sulfide | 39.8 |
| Dimethylol urea (commercial grade containing approx. 11% by weight water) | 81.0 |
| Aqueous ammonia (approx. 28% NH$_3$) | 12.0 |
| Sodium hydroxide in 6 parts water | 0.12 |
| Water | 50.0 |
| Chloracetamide | 0.5 |

All of the above components with the exception of the chloracetamide were heated together under reflux for 15 minutes, yielding a clear syrup. After adding the above-stated amount of chloracetamide, the mixture was refluxed for an additional 5 minutes. The syrupy condensation product thereby obtained was mixed with 35 parts alpha cellulose in flock form and 0.2 part zinc stearate. The wet compound was dried for 1½ hours and was then powdered. A sample of the dried and pulverized material was molded for 10 minutes at 140° C. under a pressure of 2,000 pounds per square inch. The molded piece was hard and well-cured throughout and showed good plastic flow during molding.

*Example 5*

| | Parts |
|---|---|
| 4,6-diamino pyrimidyl-2 carbamyl-methyl sulfide | 19.9 |
| Furfural | 28.8 |
| Aqueous ammonia (approx. 28% NH$_3$) | 4.8 |
| Sodium hydroxide in 2 parts water | 0.04 |

The above components were heated together under reflux for 15 minutes, yielding a clear, dark-brown liquid resinous mass. This resinous mass is rendered heat-convertible by adding active or latent curing catalysts or by intercondensation with chloracetamide, sulfamic acid or other curing reactants as described under Example 1. Sodium chloracetate also accelerates the curing of the resin. Sulfamic acid gives a more rapidly curing resin than chloracetamide or sodium chloracetate.

*Example 6*

| | Parts |
|---|---|
| 4,6-diamino pyrimidyl-2 carbamyl-methyl sulfide | 19.9 |
| Acrolein | 16.8 |
| Aqueous ammonia (approx. 28% NH$_3$) | 2.7 |
| Sodium hydroxide in 2 parts water | 0.04 |

The above components were heated under reflux for 15 minutes, yielding a gummy mass suspended in solution. When a sample of this gummy mass was heated on a 135° C. hot plate, it bodied to a thermoplastic resin. A heat-curable resin is produced by incorporating into the thermoplastic resin active or latent curing catalysts or by intercondensation with curing reactants as described under Example 1. The addition of sulfamic acid rapidly cured the gummy mass to a hard, insoluble and infusible resin. With chloracetamide and sodium chloracetate the curing of the resin was less rapid than with sulfamic acid.

*Example 7*

| | Parts |
|---|---|
| 4,6-diamino pyrimidyl-2 carbamyl-methyl sulfide | 19.9 |
| n-Butyl alcohol | 37.0 |
| Aqueous formaldehyde (approx. 37.1% HCHO) | 32.4 |
| Aqueous ammonia (approx. 28% NH$_3$) | 5.7 |
| Sodium hydroxide in 3½ parts water | 0.07 | were heated together under reflux for 20 minutes, yielding a clear, viscous, resinous syrup. This syrup, when tested on a hot plate, did not cure to an insoluble, infusible state. However, heat-curable resins were produced by adding chloracetamide, sodium chloracetate, sulfamic acid or other active or latent curing catalysts or curing reactants as described under Example 1.

*Example 8*

| | Parts |
|---|---|
| 4,6-diamino pyrimidyl-2 carbamyl-methyl sulfide | 19.9 |
| Glycerol | 9.4 |
| Aqueous formaldehyde (approx. 37.1% HCHO) | 32.4 |
| Aqueous ammonia (approx. 28% NH$_3$) | 6.0 |
| Sodium hydroxide in 2.5 parts water | 0.05 | were heated together under reflux for 15 minutes. A clear, light yellow resinous syrup was obtained. When a sample of this syrup was heated on a 135° C. hot plate, a thermoplastic resinous mass of a rubbery texture was produced. A thermosetting resinous composition is obtained by adding, either to the syrup or to the thermoplastic resin, active or latent curing catalysts or by intercondensation with curing reactants as described under Example 1. A film of the syrup, to which chloracetamide had been added, was baked on a glass plate for one hour at 60° C., yielding a clear, hard, baked film.

*Example 9*

| | Parts |
|---|---|
| 4,6-diamino pyrimidyl-2 carbamyl-methyl sulfide | 19.9 |
| Polyvinyl alcohol | 26.4 |
| Aqueous formaldehyde (approx. 37.1% HCHO) | 64.8 |
| Aqueous ammonia (approx. 28% NH$_3$) | 1.5 |
| Sodium hydroxide in 3.5 parts water | 0.07 |
| Water | 50.0 | were heated together under reflux for 15 minutes, yielding a clear resinous syrup. When a sample of this syrup was heated on a 135° C. hot plate, it bodied to a rubbery thermoplastic mass. With chloracetamide, sodium chloracetate, citric acid, sulfamic acid or other active or latent curing catalysts or curing reactants such as mentioned under Example 1, the syrup quickly cured to an insoluble and infusible resinous mass. A film of the dehydrated syrup to which chloracetamide had been added was baked on a glass plate for one hour at 60° C. The baked film was clear, transparent and hard.

*Example 10*

| | Parts |
|---|---|
| 4,6-diamino pyrimidyl-2 carbamyl-methyl sulfide | 19.9 |
| Diethyl malonate | 16.0 |
| Aqueous formaldehyde (approx. 37.1% HCHO) | 48.6 |
| Aqueous ammonia (approx. 28% NH$_3$) | 3.6 |
| Sodium hydroxide in 2 parts water | 0.04 |

The above components were heated together for 15 minutes under reflux at the boiling temperature of the mass. A clear, light yellow resinous syrup was obtained. When this syrup was heated on a hot plate it slowly bodied to a thermoplastic mass. Heat-convertible resins of good curing characteristics were produced by adding active or latent curing catalysts or by intercondensation with curing reactants as described under Example 1.

Example 11

| | Parts |
|---|---|
| 4,6-diamino pyrimidyl-2 phenylcarbamylmethyl sulfide | 27.5 |
| Aqueous formaldehyde (approx. 37.1% HCHO) | 32.4 |
| Aqueous ammonia (approx. 28% NH₃) | 2.70 |
| Sodium hydroxide in a small amount of water | 0.03 |
| Chloracetamide | 0.8 |

All of the above components with the exception of the chloracetamide were heated together under reflux for 12 minutes. The stated amount of chloracetamide was now added and refluxing was continued for an additional 2 minutes to effect intercondensation between the chloracetamide and the partial condensation product of the pyrimidine derivative and formaldehyde. The pH of the syrup was 6.02. This syrup was mixed with 20.9 parts alpha cellulose in flock form and 0.2 part zinc stearate to form a molding compound. The wet compound was dried at 60° C. A sample of the dried compound was molded at 135° C. for 3 minutes under a pressure of 2,000 pounds per square inch. The molded piece was well-cured throughout and showed good plastic flow during molding.

Example 12

| | Parts |
|---|---|
| 4,6-diamino pyrimidyl-2 phenylcarbamylmethyl sulfide | 8.3 |
| Urea | 7.2 |
| Aqueous formaldehyde (approx. 37.1% HCHO) | 48.6 |
| Sodium hydroxide in a small amount of water | 0.03 |
| Aqueous ammonia (approx. 28% NH₃) | 1.5 |
| Chloracetamide | 0.3 |

All of the above components with the exception of the chloracetamide were heated together under reflux for 15 minutes. The stated amount of chloracetamide was added to the resulting resinous syrup, after which the syrup was mixed with 25.9 parts alpha cellulose in flock form and 0.2 part zinc stearate to form a molding compound. The wet compound was dried at 60° C. Well-knit and well-cured molded pieces were produced by molding samples of the dried compound for 3 minutes at 135° C. under a pressure of 2,000 pounds per square inch. The molding compound showed excellent flow characteristics during molding.

Example 13

| | Parts |
|---|---|
| 4,6-diamino pyrimidyl-2 phenylcarbamylmethyl sulfide | 22.0 |
| Para-toluene sulfonamide | 3.4 |
| Aqueous formaldehyde (approx. 37.1% HCHO) | 32.4 |
| Aqueous ammonia (approx. 28% NH₃) | 2.5 |
| Sodium hydroxide in a small amount of water | 0.03 |
| Chloracetamide | 0.5 |

All of the above ingredients with the exception of the chloracetamide were heated together under reflux for 12 minutes. The chloracetamide was now added and refluxing was continued until a clear solution was obtained. The resulting resinous syrup was mixed with 20.3 parts alpha cellulose in flock form and 0.2 zinc stearate. The wet compound was dried at 60° C. The plasticizing effect of the para-toluene sulfonamide was evidenced by the fact that the molding compound cured relatively slowly to an insoluble, infusible state. The curing rate may be accelerated by increasing the amount of chloracetamide or, if desired, by replacing the chloracetamide with active curing catalysts such, for example, as phthalic acid. The slower curing compounds would be especially suitable for use in producing molded articles of complicated design and where considerable plasticity is required in order that the compound will flow to all parts of the mold.

Example 14

| | Parts |
|---|---|
| 4,6-diamino pyrimidyl-2 phenylcarbamylmethyl sulfide | 27.6 |
| Dimethylol urea (commercial grade containing approx. 11% by weight water) | 40.4 |
| Aqueous ammonia (approx. 28% NH₃) | 2.7 |
| Sodium hydroxide in a small amount of water | 0.03 |
| Chloracetamide | 0.3 |

The above ingredients, with the exception of the chloracetamide, were heated under reflux for 15 minutes. The chloracetamide was now added and refluxing was continued for an additional minute. The resulting reaction product, which separated into two layers, was mixed with 23.6 parts alpha cellulose and 0.2 part zinc stearate. The wet compound was dried at 60° C. A molded piece that exhibited excellent cure, cohesion and flow characteristics was obtained by pressing a sample of the dried compound for 3 minutes at 135° C. under a pressure of 2,000 pounds per square inch.

Example 15

| | Parts |
|---|---|
| 4,6-diamino pyrimidyl-2 phenylcarbamylmethyl sulfide | 1.9 |
| Phenol-formaldehyde resinous partial condensation product | 60.0 |
| Oxalic acid | 1.1 |

The phenolic resin mentioned in the above formula was prepared by heating a mixture of 90 parts synthetic phenol, 195 parts aqueous formaldehyde containing approximately 37.1% HCHO and 2.55 parts potassium carbonate at 65° C. for 4 hours. The above-stated amounts of pyrimidine derivative and phenol-formaldehyde partial condensation product, together with a very small amount of sodium hydroxide, were heated together under reflux for 30 minutes. The oxalic acid was added to the resulting syrup, which was then mixed with 23.2 parts alpha cellulose and 0.2 part zinc stearate. The wet compound was dried and a sample of the dried compound was molded for 3 minutes at 135° C. under a pressure of 2,000 pounds per square inch. A well-cured molded article having excellent cohesive properties was obtained. The molding compound showed good flow properties during molding.

Example 16

| | Parts |
|---|---|
| 4,6-diamino pyrimidyl-2 phenylcarbamyl-methyl sulfide | 10.3 |
| Acrolein | 8.4 |
| Sodium hydroxide in a small amount of water | 0.01 | were heated together under reflux for 20 minutes. When the resulting syrup was heated on a 120° C. hot plate a thermoplastic resin was obtained. Heat-convertible resins are produced by incorporating, either into the syrup or into the thermoplastic resin, active or latent curing catalysts or by intercondensation with curing reactants as described under Example 1. The addition of sulfamic acid yielded a heat-curable resin which cured to the insoluble, infusible state more rapidly than one wherein chloracetamide was used.

Example 17

| | Parts |
|---|---|
| 4,6-diamino pyrimidyl-2 phenylcarbamyl-methyl sulfide | 10.3 |
| Butyl alcohol | 14.0 |
| Aqueous formaldehyde (approx. 37.1% HCHO) | 16.2 |
| Sodium hydroxide in a small amount of water | 0.02 |

The above ingredients were heated together under reflux for 15 minutes. The resulting syrup was dehydrated by heating it on a steam plate. The dehydrated syrup was found to be soluble in solvents such, for example, as ethyl alcohol, ethylene glycol, etc. The solubility and film-forming characteristics of this resin make it especially suitable for use in the production of spirit and baking varnishes. It may be used as a modifier of varnishes of the aminoplast and alkyd-resin types. The resinous syrup was mixed with a curing agent, specifically a small amount of hydrochloric acid. A film of this acid-catalyzed syrup was then applied to a glass plate, which thereafter was baked for several hours at 60° C. A hard, semi-transparent, baked film was produced on the plate.

Other active or latent curing catalysts or curing reactants may be added to the resinous syrup, as described under Example 1, to yield heat-hardenable resinous compositions.

Example 18

| | Parts |
|---|---|
| 4,6-diamino pyrimidyl-2 phenylcarbamyl-methyl sulfide | 10.3 |
| Glycerine | 3.5 |
| Aqueous formaldehyde (approx. 37.1% HCHO) | 16.2 |
| Sodium hydroxide in a small amount of water | 0.015 |

A clear resinous syrup was prepared by heating the above ingredients under reflux for 30 minutes and then dehydrating the resulting syrup on a steam plate. The resinified syrup is soluble in solvents such, for example, as ethyl alcohol, butyl alcohol, ethylene glycol, etc. This resin may be used in the production of varnishes as described in the previous example.

A sample of the resin was treated with a curing agent and a film of the resulting product then applied to a glass plate, which thereafter was baked for several hours at 60° C. The baked film was transparent, adhered tightly to the glass surface and showed excellent resistance to water.

Example 19

| | Parts |
|---|---|
| 4,6-diamino pyrimidyl-2 phenylcarbamyl-methyl sulfide | 20.6 |
| Polyvinyl alcohol | 3.4 |
| Aqueous formaldehyde (approx. 37.1% HCHO) | 48.6 |
| Sodium hydroxide in a small amount of water | 0.012 |
| Water | 100.0 | were heated together under reflux for 15 minutes to yield a clear syrup. When this resinous syrup was treated with a curing agent (numerous examples of which were given under Example 1) and the resulting product baked in film form on a glass surface for several hours at 60° C., a baked transparent film that adhered tightly to the glass surface was obtained.

The resinous composition of this example may be used in the production of baking varnishes. It also may be used in the preparation of molding compounds after incorporating therein active or latent curing catalysts or curing reactants as described under Example 1.

Example 20

| | Parts |
|---|---|
| 4,6-diamino pyrimidyl-2 phenylcarbamyl-methyl sulfide | 10.3 |
| Furfural | 15.9 |
| Sodium hydroxide in a small amount of water | 0.01 | were heated together under reflux for 30 minutes to yield a clear, resinous syrup. A heat-hardenable resinous composition is produced by incorporating into the resinous syrup or into the dehydrated resin active or latent curing catalysts or curing reactants such as described under Example 1. The thermosetting resinous masses are suitable for use in the production of molding compositions.

Example 21

| | Parts |
|---|---|
| 4,6-diamino pyrimidyl-2 phenylcarbamyl-methyl sulfide | 20.6 |
| Acetamide | 4.4 |
| Aqueous formaldehyde (approx. 37.1% HCHO) | 48.6 |
| Sodium hydroxide in a small amount of water | 0.04 | were heated together under reflux for 16 minutes. The plasticizing effect of the acetamide was evident from the relatively slow curing of the dehydrated resin at 120° C. even in the presence of such strong curing agents as sulfamic acid. Other active or latent curing catalysts or curing reactants of the kinds mentioned under Example 1 may be added if desired. The product of this example would be suitable for use where slower curing resins are desired.

Example 22

| | Parts |
|---|---|
| 4,6-diamino pyrimidyl-2 phenylcarbamyl-methyl sulfide | 20.6 |
| Diethyl malonate | 12.0 |
| Aqueous formaldehyde (approx. 37.1% HCHO) | 48.6 |
| Sodium hydroxide in a small amount of water | 0.04 | were heated together under reflux for 15 minutes. When heated on a 120° C. hot plate, the resinified syrup formed an elastic, pliable mass. Upon the addition of curing agents such as chloracetamide, sulfamic acid, alpha, beta-dibrompropionitrile, and other active and latent curing catalysts and curing reactants such as mentioned under Example 1, less rubbery and more highly cured resins were obtained. The resinous composition of this example is suitable for use in the production of molding compounds where a high degree of plasticity is desired.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes which may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, selenourea and iminourea, and of substituted ureas, thioureas, selenoureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and active methylene-containing bodies may be employed, e. g., mixtures of formaldehyde and methylol compounds such, for instance, as dimethylol urea and trimethylol melamine.

The ratio of the aldehydic reactant to the pyrimidine derivative may be varied over a wide range, but ordinarily the reactants are employed in an amount corresponding to at least one mol of the aldehyde, specifically formaldehyde, for each mol of the pyrimidine derivative. Thus we may use, for example, from one to five or six mols of an aldehyde for each mol of pyrimidine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkylol derivatives for each mol of the pyrimidine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, e. g., acrylonitrile, methacrylonitrile, succinonitrile, including halogenated nitriles, etc.; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.) alone or admixed with, for example, urea, melamine, or urea and melamine, resins obtained by reaction of an aldehyde with other aminodiazines (e. g., 2,4,6 - triaminopyrimidine, 2,4 - diaminoquinazoline, etc.), with the aminotriazines or with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a pyrimidyl carbamyl-alkyl sulfide (or a pyrimidyl thiocarbamyl-alkyl sulfide) of the kind herein described and an aldehyde, e. g., formaldehyde, we may cause an aldehyde to condense with a salt of the pyrimidine derivative or with a mixture of the pyrimidine derivative and a salt (organic or inorganic) thereof. As examples of salts of the pyrimidine derivatives that may be used, we mention salts of mono-, di- and triamino pyrimidyl carbamyl-methyl, carbamyl-ethyl, thiocarbamyl-methyl and thiocarbamyl-ethyl sulfides and organic or inorganic acids as, for instance, hydrochloric, sulfuric, phosphoric, boric, acetic, chloracetic, propionic, butyric, valeric, acrylic, polyacrylic, methacrylic, polymethacrylic, oxalic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and an organic sulfide corresponding to the general formula

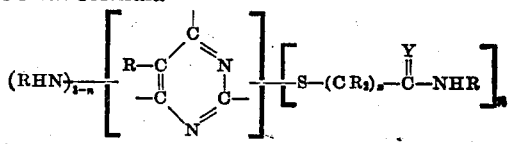

where $n$ is an integer and is at least 1 and not more than 3, $x$ is an integer and is at least 1 and not more than 2, R is a member of the class consisting of hydrogen nad nonvalent hydrocarbon and halo-hydrocarbon radicals, and Y is a member of the class consisting of oxygen and sulfur.

2. A composition as in claim 1 wherein the aldehyde is formaldehyde.

3. A composition comprising a condensation product of ingredients comprising an aldehyde and an organic sulfide corresponding to the general formula

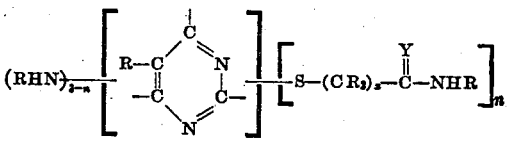

where $n$ is an integer and is at least 1 and not more than 3, $x$ is an integer and is at least 1 and not more than 2, Y is a member of the class consisting of oxygen and sulfur and R represents hydrogen.

4. A composition comprising a condensation product of ingredients comprising an aldehyde and an organic sulfide corresponding to the general formula

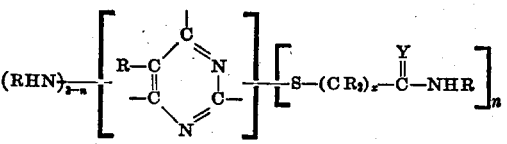

where $n$ is an integer and is at least 1 and not more than 3, $x$ is an integer and is at least 1 and not more than 2, R represents hydrogen and Y represents oxygen.

5. A composition comprising a condensation product of ingredients comprising formaldehyde and an organic sulfide corresponding to the general formula

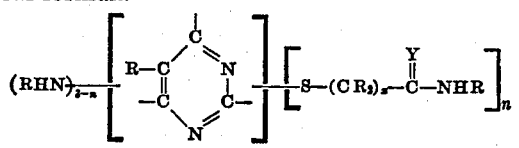

where $n$ is an integer and is at least 1 and not more than 3, $x$ is 1, R represents hydrogen and Y represents oxygen.

6. A resinous composition comprising the product of reaction of ingredients comprising pyrimidyl tri-(carbamyl-methyl sulfide) and an aldehyde.

7. A resinous composition comprising the product of reaction of ingredients comprising a monoamino pyrimidyl di-(carbamyl-methyl sulfide) and an aldehyde.

8. A resinous composition comprising the product of reaction of ingredients comprising diamino pyrimidyl carbamyl-methyl sulfide and an aldehyde.

9. A resinous composition comprising the product of reaction of ingredients comprising formaldehyde and 4,6-diamino pyrimidyl-2 carbamyl-methyl sulfide.

10. A heat-curable resinous condensation product of ingredients comprising formaldehyde and an organic sulfide corresponding to the general formula

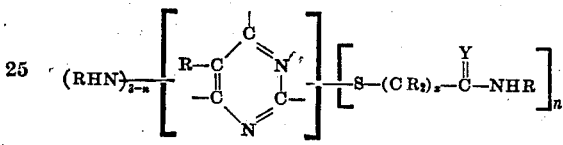

where $n$ is an integer and is at least 1 and not more than 3, $x$ is 1, R represents hydrogen and Y represents oxygen.

11. A product comprising the heat-cured resinous condensation product of claim 10.

12. A composition as in claim 1 wherein the reaction product is an alkaline-catalyzed reaction product of the stated components.

13. A composition as in claim 1 wherein the reaction product is an alcohol-modified reaction product of the stated components.

14. A composition comprising the product of reaction of ingredients comprising urea, a diamino pyrimidyl carbamyl-methyl sulfide and an aldehyde.

15. A composition comprising the product of reaction of ingredients comprising melamine, a diamino pyrimidyl carbamyl-methyl sulfide and formaldehyde.

16. A composition comprising the product of reaction of ingredients comprising a phenol, an aldehyde and an organic sulfide corresponding to the general formula

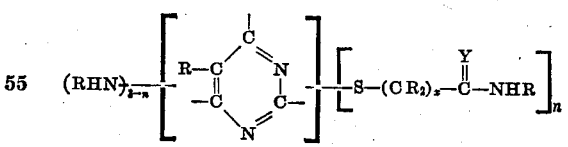

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur.

17. A heat-curable composition comprising the heat-convertible product of reaction of (1) a partial condensation product of ingredients comprising urea, a diamino pyrimidyl carbamyl-methyl sulfide and formaldehyde and (2) a chlorinated acetamide.

18. A product comprising the heat-cured composition of claim 17.

19. The method of preparing new condensation products which comprises effecting reaction between ingredients comprising an aldehyde and an organic sulfide corresponding to the general formula

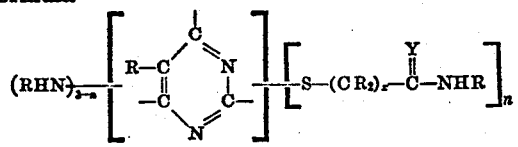

where $n$ is an integer and is at least 1 and not more than 3, $x$ is an integer and is at least 1 and not more than 2, R is a member of the class consisting of hydrogen and monovalent hydrocarbon and halo-hydrocarbon radicals, and Y is a member of the class consisting of oxygen and sulfur.

GAETANO F. D'ALELIO.
JAMES W. UNDERWOOD.

CERTIFICATE OF CORRECTION.

Patent No. 2,317,737. April 27, 1943.

GAETANO F. D'ALELIO, ET AL.

It is hereby certified that error appears in the printed specification of the above numbered patent requiring correction as follows: Page 4, first column, line 5, Example 3, for "pound" read --pounds--; page 8, first column, line 31, claim 1, for "nad" read --and--; same line, for "nonvalent" read --monovalent--; and that the said Letters Patent should be read with this correction therein that the same may conform to the record of the case in the Patent Office.

Signed and sealed this 8th day of June, A. D. 1943.

Henry Van Arsdale,
Acting Commissioner of Patents.

(Seal)